(12) United States Patent
Gee

(10) Patent No.: US 7,584,940 B2
(45) Date of Patent: Sep. 8, 2009

(54) TREE STAND LOCK APPARATUS AND METHOD OF USE

(76) Inventor: Benjamin Ray Gee, 533 Hankey Mountain Highway, Churchville, VA (US) 24421

( * ) Notice: Subject to any disclaimer, the term of this patent is extended or adjusted under 35 U.S.C. 154(b) by 0 days.

(21) Appl. No.: 12/189,870

(22) Filed: Aug. 12, 2008

(65) Prior Publication Data

US 2009/0064743 A1 Mar. 12, 2009

Related U.S. Application Data

(60) Provisional application No. 60/993,402, filed on Sep. 12, 2007.

(51) Int. Cl.
 *B21F 9/00* (2006.01)
(52) U.S. Cl. .......... 254/238; 254/218; 254/221; 254/409; 254/380; 24/70 ST; 24/69 ST; 452/185; 182/135
(58) Field of Classification Search .......... 254/217, 254/218, 221, 223, 238, 239, 401, 409, 329, 254/380; 24/70 CT, 70 ST, 69 ST, 69 CT; 452/185, 187, 189; 182/116, 133, 187, 135
See application file for complete search history.

(56) References Cited

U.S. PATENT DOCUMENTS

| 2,874,431 | A | | 2/1959 | Elsner | |
|---|---|---|---|---|---|
| 2,993,680 | A | | 7/1961 | Davis | |
| 3,175,806 | A | | 3/1965 | Prete | |
| 4,542,883 | A | * | 9/1985 | Rutzki | 254/217 |
| 4,582,165 | A | * | 4/1986 | Latini | 182/20 |
| 5,655,623 | A | * | 8/1997 | Skyba | 182/116 |
| 6,053,278 | A | * | 4/2000 | Myers | 182/20 |
| 6,668,976 | B2 | | 12/2003 | Graham | |
| 6,698,723 | B1 | | 3/2004 | Antonini | |
| 6,886,377 | B2 | | 5/2005 | Cohen | |
| 6,948,589 | B2 | | 9/2005 | Johnson | |
| 7,207,415 | B2 | | 4/2007 | McGehee | |
| 7,258,200 | B2 | | 8/2007 | Forrest | |
| 7,296,658 | B1 | * | 11/2007 | Pederson | 182/133 |
| 7,360,753 | B1 | * | 4/2008 | Lin | 254/218 |
| 7,448,596 | B1 | * | 11/2008 | Chang | 254/223 |
| 7,476,149 | B2 | * | 1/2009 | Burrows | 452/187 |
| 7,510,168 | B1 | * | 3/2009 | Lin | 254/218 |
| 2007/0209410 | A1 | | 9/2007 | Clum | |
| 2007/0256892 | A1 | * | 11/2007 | Breedlove, Sr. | 182/116 |

* cited by examiner

*Primary Examiner*—Emmanuel M Marcelo
(74) *Attorney, Agent, or Firm*—Goodman Allen & Filetti, PLLC; Charles M. Allen; Thedford I. Hitaffer

(57) ABSTRACT

A tree stand lock apparatus comprises a ratchet buckle part and a wire rope part. The ratchet buckle part comprises a spool with a transaxial bore, a ratcheting lever handle, a locking means and a base affixed to a hook. The wire rope part comprises a wire rope, one end of which is affixed to a hook. The lock may be employed by wrapping the wire rope around a portion of a tree stand, hooking the hook of the rope to the hook of the ratchet buckle and threading the wire rope through the transaxial bore. The ratchet buckle is operated to render the wire rope taut and the buckle is locked in the closed position.

12 Claims, 4 Drawing Sheets

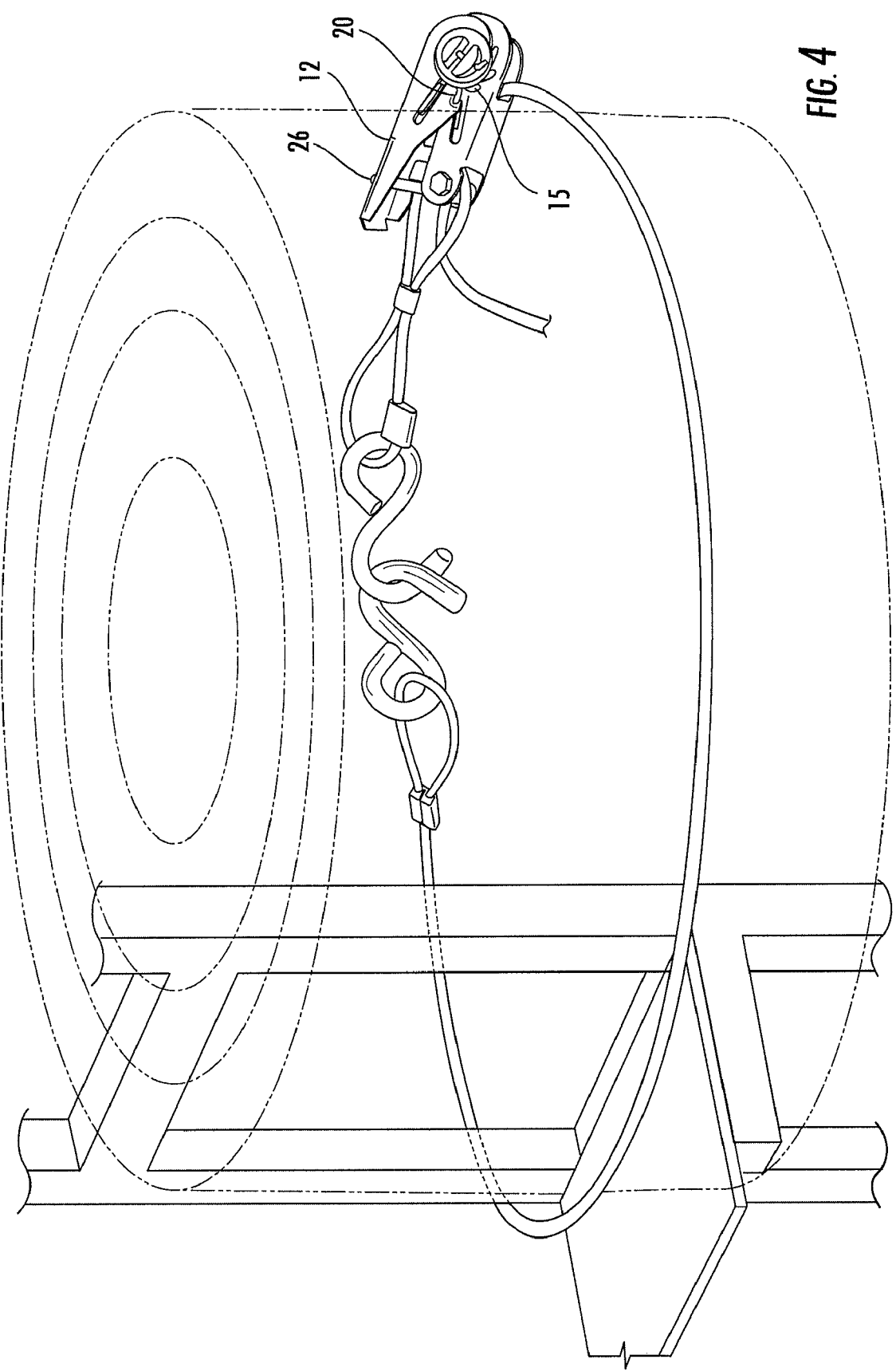

TREE STAND LOCK APPARATUS AND METHOD OF USE

RELATED APPLICATIONS

The present application claims priority from a provisional patent application, U.S. Ser. No. 60/993,402, filed Sep. 12, 2007, which is incorporated here by reference.

BACKGROUND OF THE INVENTION

1. Field of the Invention

This invention relates to a locking mechanism used for securing a tree stand to a tree, which is quick and easy to use, adjustable, durable, and prevents theft of the tree stand.

2. Introduction

The advantage of hunting from an elevated position is well known to hunters. Hunters positioned in trees are not easily seen or smelled by their prey. At the same time, a sufficiently elevated position often affords the hunter a greater field of vision than is achieved by a position on the ground. Thus, an elevated hunting position is advantageous.

Most often, hunters achieve this advantage by positioning themselves in trees. While simply climbing a tree and perching on its limbs and branches may be sufficient to secure an elevated hunting position, doing so is uncomfortable, particularly if the hunter desires to remain in position for more than a brief period of time. Additionally, resting on limbs may also raise safety issues since the limbs and branches may not provide a sufficient surface for sitting or standing. This problem is even more prevalent because the hunter must also carefully aim and shoot while located in the tree and must be able to receive the force of the kickback from the gun without loosing balance or footing while in the tree.

Fixed tree stands, that is those most often constructed of wood and erected as a permanent fixture in a tree, are often used by hunters. These stands, however, pose disadvantages. For example, they are expensive and time-consuming to erect and they may not be re-located to a new hunting location when it may become desirable to do so. Accordingly, hunters increasingly use portable tree stands.

A wide variety of portable tree stands are commercially available. These stands are usually constructed of light weight materials and provide the hunter a surface upon which to sit or stand. The stands most often are affixed to a tree by straps which allow the stand to be quickly removed and re-located and which also avoid damaging the tree. Frequently the straps must be tensioned in order to secure the stand in place. A variety of tensioning mechanisms may be employed, such as the commonly used ratcheting buckle similar to that disclosed in U.S. Pat. No. 3,175,806 (Prete).

Hunters often desire to leave their tree stands in the hunting area, unattended, for substantial periods of time. Because the hunting areas are remote from observation, usually located deep within a forest, and because portable tree stands may be quickly and easily removed from a tree, these stands may be easily stolen. Additionally, where the portable stand is secured to a tree by straps, the straps may become worn by exposure to natural elements, and ultimately may become unserviceable and dangerous to life and limb.

Several prior art inventions attempt to address the security of portable tree stands. Thus, U.S. Pat. No. 6,886,377 (Cohen) provides a locking mechanism which secures a tree stand to a tree. The Cohen apparatus comprises an eye bolt which is installed in the tree proximate to the location of the stand. A bracket is fashioned which covers the lateral portions of the structure of the tree stand and which receives the eye of the eye bolt in a central opening of the bracket. A keyed locking mechanism locks the bracket to the eyebolt.

While the Cohen invention provides for an apparatus to secure some tree stands, it suffers several disadvantages. Because the bracket must cover a substantial portion of the supporting structure of the tree stand and because the supporting structures of tree stands vary in construction, a single apparatus according to the Cohen patent is not readily adaptable to a wide variety of stands. Also, the insertion and removal of the eyebolt, which is necessary to relocate a tree stand employing the Cohen invention, is inconvenient. Additionally, because the eyebolt must be received at a precise location within the bracket and the bracket must be aligned with the structure of the stand, an undesirable, and sometimes unattainable, amount of precision is required for the placement of the eyebolt, increasing time and effort needed to utilize the device.

Likewise, U.S. Patent Application Publication No. 2007/0209410 (Clum) discloses a tree stand lock comprising a hardened metal loop which is affixed to brackets integrally attached to the structure of the tree stand. It should be appreciated that the security of the Clum device is entirely dependent upon the integrity of the connection of the brackets to the structure. More specifically, if the brackets can be easily disconnected or separated from the tree strand structure, the security provided is minimal. Likewise, because the brackets must be securely fastened to the structure of the tree stand, the Clum apparatus is not easily adapted to a wide variety of tree stands and it may not be conveniently attached to an existing tree stand.

There is, therefore, a need for a tree stand lock apparatus which may easily and conveniently be employed. There is also a need for a tree stand lock apparatus which is durable and adjustable and which can be used with a wide variety of tree stands, without alteration of the stand.

3. Objects of the Invention

It is an object of the invention to provide a tree stand lock apparatus that may be easily and conveniently employed with a wide variety of tree stands. It is also an object of the invention to provide a tree stand lock apparatus that can be quickly and easily adjusted to a wide range of tree circumferences and which is durable and resistant to deterioration during adverse weather conditions. Finally, it is an object of the invention to provide a method for the use of the tree stand lock apparatus for the quick deployment of the apparatus.

BRIEF SUMMARY OF THE INVENTION

These and other objects are accomplished by a tree stand lock comprising a length of wire rope, one end of which is integrally affixed to a first hook, and a locking ratchet buckle. The locking ratchet buckle comprises a base, a ratcheting lever handle, and a spool, the center of which contains a bore of sufficient diameter that the wire rope may pass through the bore. The base of the locking ratchet buckle is integrally attached to second hook. A locking means is provided by which the ratcheting lever handle of the ratchet buckle may be fixed in position relative to the base and such that a detent prevents the spool from releasing while the ratchet buckle is locked.

The tree stand lock apparatus may be quickly and conveniently employed with a variety of tree stands. For stands which are affixed to a tree by web straps which are laced through a portion of the stand, if the portion of the stand through which the strap is laced is of sufficient size to accommodate the wire rope, the wire rope may be laced through that portion to replace the strap. Alternatively, the wire rope may be laced through a portion of the structure of the tree stand or simply employed to encircle both a portion of the structure adjacent the tree and the tree. After the wire rope has been laced through or around the structure, the hook on the end of the wire rope is connected to the hook affixed to the ratchet buckle. The free end of the wire rope is placed around the tree, encircling it, and then laced through the bore of the spool of the ratchet buckle. The wire rope is then pulled taut. Finally, the ratchet buckle is ratcheted so that the any remaining slack in the wire rope is eliminated. Thereafter the ratchet buckle is locked to prevent the spool from releasing.

The tree stand lock apparatus disclosed herein, when employed according to the method disclosed herein, may be placed upon a tree stand in a few minutes. In most cases, three or fewer ratcheting motions are necessary to the secure the wire rope. The apparatus is also durable, especially where a plastic-covered or plastic-infused wire rope is used. Finally, the apparatus is not easily removed by hunters or others who might be inclined to steal the associated tree stand. While straps might be easily cut by a hunter's knife, the wire rope and lock may be breached only by substantial tools, such as a bolt cutter, not usually carried by hunters in the forest.

BRIEF DESCRIPTION OF THE DRAWINGS

The invention is described in detail with reference to the following drawings in which like reference numerals refer to like elements:

FIG. 4 is a perspective view of a preferred embodiment of the invention with the invention in the locked position.

DETAILED DESCRIPTION OF THE INVENTION

Figure 1:
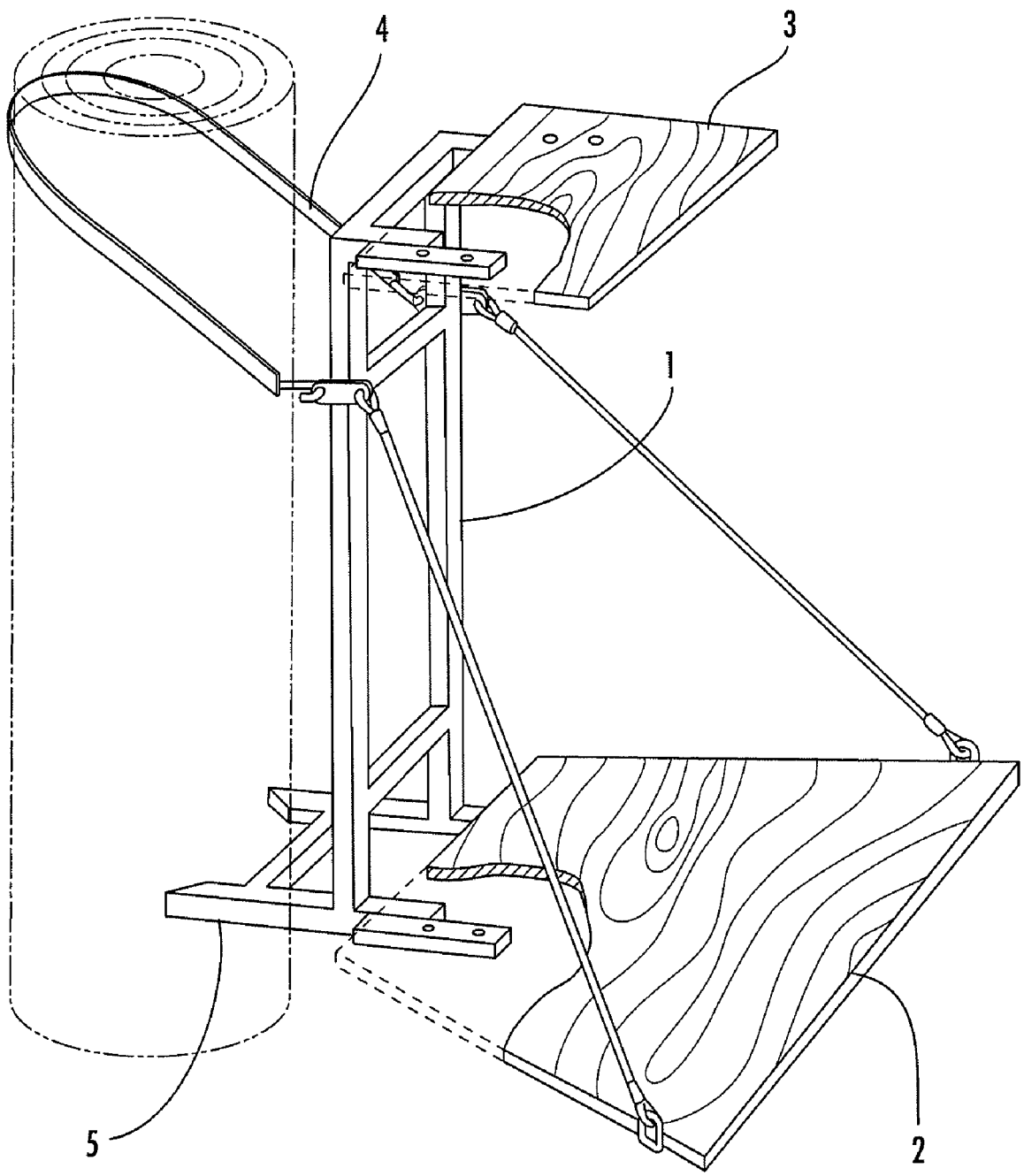
FIG. 1 is a perspective view of a common prior art tree stand.

Referring to FIG. 1, a common tree stand, according to the prior art, is depicted. The tree stand comprises a generally vertical structural member (1) which extends upward generally parallel to the tree upon which the tree stand is erected. The stand further comprises two generally horizontal structural members, (2, 3) the first of which is larger than the second and forms a platform area (2) upon which a hunter may stand or sit. The second and smaller generally horizontal structural member (3) comprises a seat on which a hunter may sit with his feet resting on the platform. A restraining means (4), comprising a belt, a strap, a rope or a wire rope, is connected to the upper end of the apparatus, proximate the seat (3). The restraining means may be laced through an opening in the vertical structural member (1), the smaller horizontal structural member (3) or both. Alternatively, the restraining means may be integrally affixed to the vertical structural member, as is shown in FIG. 1, or affixed to the smaller horizontal structural member. The restraining means is commonly adjustable in order that the restraining means may be made taut as it encircles the tree. A structural contact member (5) in contact with the tree serves to locate the apparatus a small distance from the tree and, upon loading, to permit the apparatus to rotate slightly about the point of contact such that the restraining means (4) is further tightened when the tree stand is occupied.

Figure 2:
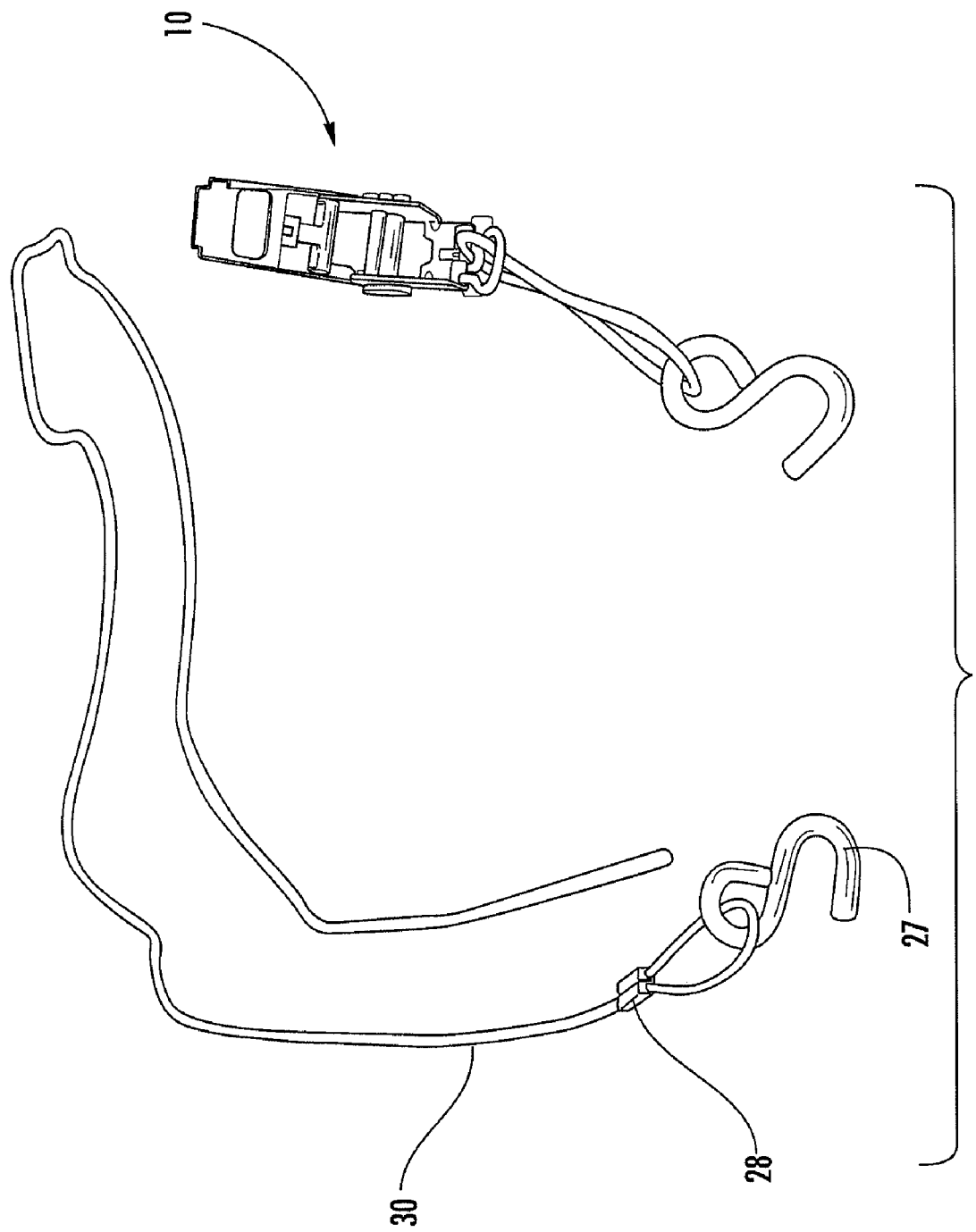
FIG. 2 is a perspective view of a preferred embodiment of the invention.

Referring to FIG. 2, a preferred embodiment of the tree stand lock apparatus is depicted. The apparatus comprises two parts. The first part comprises a ratchet buckle (10). The second part comprises a length of wire rope integrally attached to a hook. The ratchet buckle is of common construction, similar to that disclosed in U.S. Pat. No. 2,993,680 (Davis), except that a locking means is provided which allows the ratcheting lever handle to be locked to the base and a bore through the spool of the buckle is provided, the purpose for which is described herein. It is appreciated by those skilled in the art that the term "bore" as used in this disclosure is not intended to limit this invention to a bore formed by the process of boring. Rather, the bore, as used in this disclosure, may also formed by drilling, forming, casting, cutting, or other equivalent means.

Figure 3:
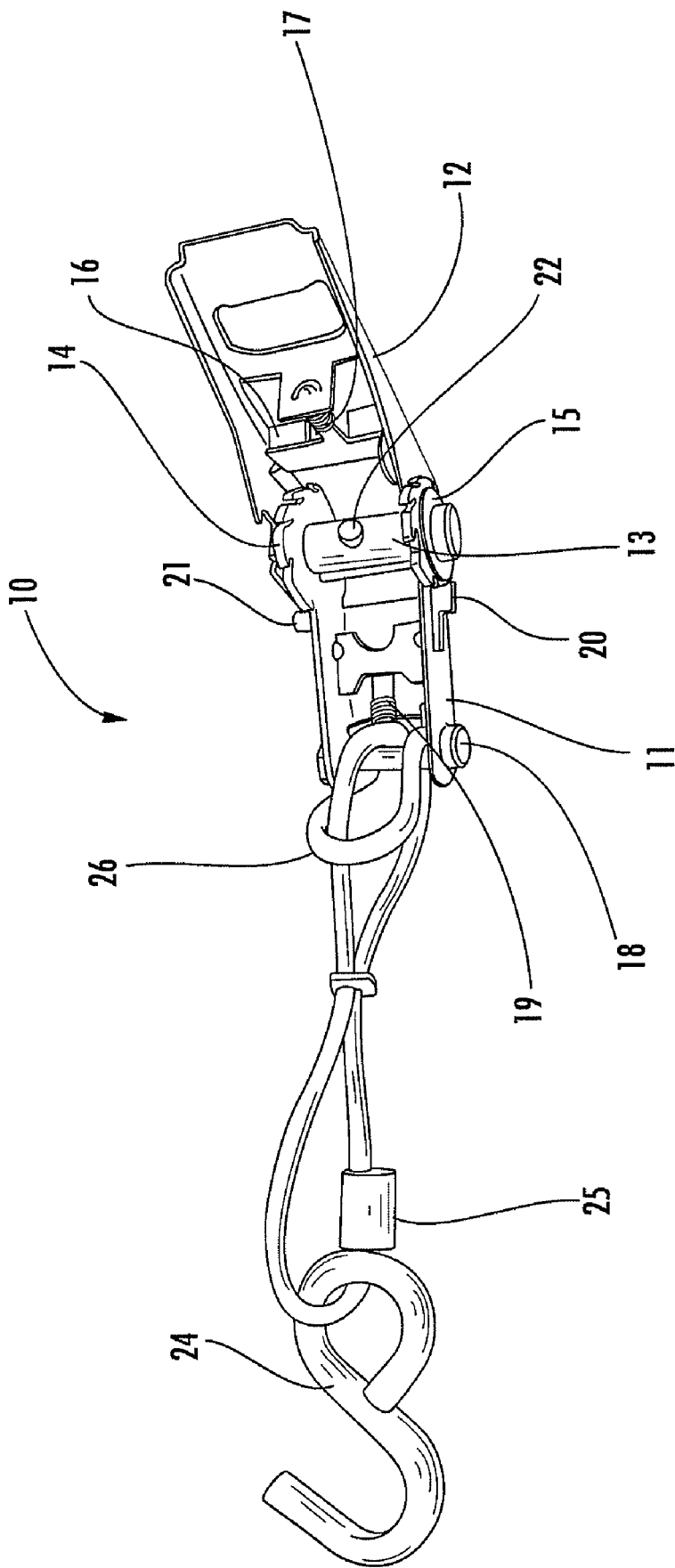
FIG. 3 is a perspective view of a ratchet buckle portion of a preferred embodiment of the invention.

Referring now to FIG. 3, the ratchet buckle comprises a base (11), a ratcheting lever handle (12), and a spool (13). The spool (13) is disposed within openings in the lateral portions of the base (11) and extends outward through openings in the lever handle (11). The lever handle is thus rotatably affixed to the spool and the base. At the lateral portions of the spool (13) intermediate to the base (11) and the handle (12) first and second ratchet wheels (14, 15) are affixed. A u-shaped yoke (16) disposed within the ratcheting lever handle (12) terminates in pawls which cooperate with the first and second ratchet wheels (14, 15) to advance the spool. The yoke (16) is biased by spring (17) which permits the yoke (16) to engage the wheels (14, 15) when the ratcheting lever handle (12) is moved to the open position and to allow the pawls to advance to the next teeth on each wheel when the handle (12) moved to the closed position. A u-shaped detent (18) is disposed within the base. The detent engages teeth of the first and second ratchet wheels (14, 15) to prevent the spool from releasing. The detent is biased by a spring (19) so that it permits the ratchet wheels to advance as the handle is moved to the open position.

A first and second extension (20, 21) of the detent extend outwardly through slots in the left and right side walls of the base (11). The ratcheting lever handle (12) is configured so that when the lever is in the closed position, as best shown in FIG. 3, a portion of the handle (12) prevents the extension (20) from moving to release the spool.

Referring once again to FIG. 3, a bore (22) is made through the center of the spool. The diameter of the bore is slightly larger than the diameter of the wire rope (30) in order that the rope may be easily threaded through the bore (22).

The base (11) of the ratchet buckle is integrally connected to a hook. As shown in FIG. 3, a portion of wire rope (23) is looped through an opening in the base and through the opening on a metal s-hook (24). The ends of the wire rope loop join at a sleeve (25) forming and integral loop including the hook (24). It should be appreciated that the hook may be integrally affixed to the ratchet buckle in a variety of ways, including, for example, by fashioning a portion of the base of a buckle as a hook.

A metal eye (26) is rotatably affixed to the end of the base (11) distal to the spool (13). A slot in the ratcheting lever handle (12) is disposed to receive the eye (26). As shown in FIG. 4, when the handle is in the closed position, the eye (26) extends through the slot in the ratcheting handle providing a location for receiving a common keyed or combination lock. While in the preferred embodiment the locking means comprises a metal eye and a cooperating slot, those skilled in the art will recognize that a variety of locking means may be utilized. For example, the base and the ratcheting lever handle may each have holes which align when the lever handle is in the closed position and through which a lock may be inserted. Alternatively, a metal eye may be configured such that it may rotate over the lever handle and lock to a portion of the handle.

The second part of the tree stand lock, as shown in FIG. 2, comprises a length of wire rope (30). The wire rope should be of sufficient length that it can encircle a tree of substantial girth. A length of six feet is generally sufficient. One end of the wire rope is threaded through the opening of a metal s-hook (27) and fastened to the trailing portion of the wire rope using a sleeve (28), thus forming an integral loop with the attached hook (27).

The tree stand lock is conveniently employed by first passing the free end of the wire rope (30) through a structural member of the tree stand and then encircling the tree with it. Where the attachment point for the restraining means comprises an opening sufficient to accommodate the wire rope (30), the wire rope may be placed through the opening, either supplementing or substituting for the restraining means. Alternatively, the wire rope (30) may be placed around the structure of the tree stand adjacent the tree. Where the tree stand is of the variety depicted in FIG. 1, the wire rope (30) is preferably placed around the structure proximate the point of contact of the structure and the tree. That is, adjacent the structural contact member (5). In this way the natural rotation of the stand and corollary cinching of the restraining means is not inhibited.

Once the wire rope is positioned over or through the tree stand structure and encircling the tree, both the free end and the hook end of the wire rope may now be conveniently located at a location on the tree spaced apart from the tree stand. The hook (24) of the ratchet buckle is then hooked to the s-hook (27) of the wire rope (30). With the ratcheting lever handle in the open position, the free end of the rope is threaded through the bore (22) of the spool (13) and pulled to remove any slack. The lever handle (12) is then ratcheted to ensure that the wire rope is taut. When the wire rope is taut, the handle is moved to the closed position so that the eye (26) extends through the cooperating opening in the handle (12). A common keyed or combination lock (not shown) is attached to secure the lock. It will be appreciated that when the handle (12) is closed and locked, the extensions of the detent (20, 21) are prevented from disengaging the spool (13) and thus, the tension on the wire rope may not be loosened.

In a second preferred embodiment of the invention (not depicted here), a length of wire rope is attached integrally to the base of the ratchet buckle. In this instance the first and second parts of the tree stand lock are integral. That is, the wire rope is connected to the base of the ratchet buckle and the free end of the wire rope extends outward therefrom.

The invention has been described in relation to its use as a lock for a tree stand. However, it should be appreciated that the invention may be used to secure and lock items to a fixed member in a variety of applications. For example, it could be used to secure a load on a trailer or to secure camera or video camera to a tree or pole, etc. The invention has also been described in regard to its preferred embodiment. It will be apparent to those skilled in the art that the same may be varied in many ways without departing from the spirit and scope of the invention. All such modifications are intended to be included within the scope of the following claims.

I claim:

1. A tree stand lock apparatus, said lock comprising:
    a wire rope having a first and second end and having a diameter, said first end integrally affixed to a hook and,
    a ratchet buckle, said buckle comprising:
        a base, said base integrally affixed to a hook;
        a spool, said spool having a transaxial bore with a diameter greater than the diameter of said wire rope, said spool rotatably disposed within said base and having opposing lateral ratchet wheels;
        a lever handle, said handle rotatably connected to said spool and having a u-shaped yoke pivotably disposed therein, said yoke comprising opposing pawls, said yoke being spring-biased wherein said pawls are disposed to engage said opposing ratchet wheels of said spool and wherein said spool may be advanced by ratcheting;
        said base further comprising a detent pivotably disposed therein, said detent spring-biased where said detent is disposed to engage said opposing ratchet wheels to prevent said spool from reversing, and;
        a locking means, wherein said locking means locks said lever handle in relation to said base.

2. A tree stand lock according to claim 1 wherein said detent extends outward through cooperating slots in said base and wherein said lever handle is disposed to prevent said detent from disengaging said ratchet wheels when said lever handle is in the closed position.

3. A tree stand lock according to claim 1 where said locking means comprises a metal eye connected to said base and wherein said lever handle comprises a cooperating slot disposed to receive said eye therethrough wherein a lock may be placed through said eye to prevent said lever handle from being moved to the open position.

4. A tree stand lock according to claim 1 wherein said wire rope comprises plastic covered wire rope.

5. A tree stand lock according to claim 1 wherein said wire rope comprises plastic-infused wire rope.

6. A tree stand lock apparatus, said lock comprising:
    a wire rope having a first and second end and having a diameter;
    a ratchet buckle, said buckle comprising:
        a base, said base integrally affixed to the first end of said wire rope;
        a spool, said spool having a transaxial bore with a diameter greater than the diameter of said wire rope, said spool rotatably disposed within said base and having opposing lateral ratchet wheels;
        a lever handle, said handle rotatably connected to said spool and having a u-shaped yoke pivotably disposed therein, said yoke comprising opposing pawls, said yoke being spring-biased wherein said pawls are disposed to engage said opposing ratchet wheels of said spool and wherein said spool may be advanced by ratcheting;
        said base further comprising a detent pivotably disposed therein, said detent spring-biased where said detent is disposed to engage said opposing ratchet wheels to prevent said spool from reversing, and;
        a locking means, wherein said locking means locks said lever handle in relation to said base.

7. A tree stand lock according to claim 6 wherein said detent extends outward through cooperating slots in said base and wherein said lever handle is disposed to prevent said detent from disengaging said ratchet wheels when said lever handle is in the closed position.

8. A tree stand lock according to claim 6 where said locking means comprises a metal eye connected to said base and wherein said lever handle comprises a cooperating slot disposed to receive said eye therethrough wherein a lock may be placed through said eye to prevent said lever handle from being moved to the open position.

9. A tree stand lock according to claim 6 wherein said wire rope comprises plastic covered wire rope.

10. A tree stand lock according to claim 6 wherein said wire rope comprises plastic-infused wire rope.

11. A method for locking a tree stand to a tree, said method comprising the steps of:
- providing a ratchet buckle, said ratchet buckle having a spool, said spool having a transaxial bore with a diameter, said ratchet buckle integrally attached to a hook and said ratchet buckle having a locking means disposed to receive a lock;
- providing a length of wire rope, said wire rope integrally attached to a hook, said wire rope having a diameter smaller than the diameter of said bore;
- wrapping said wire rope through a portion of said tree strand and around a portion of said tree;
- hooking the hook of said wire rope to the hook of said ratchet buckle;
- threading said wire rope through said bore, wherein said wire rope and said ratchet buckle encircle a portion of said tree and include a portion of said tree stand within said circle;
- pulling said wire rope to remove the slack in said wire rope;
- ratcheting said ratchet buckle to make said wire rope taut;
- closing said ratchet buckle;
- locking said ratchet buckle.

12. A method for locking a tree stand to a tree, said method comprising the steps of:
- providing a ratchet buckle, said ratchet buckle having a spool, said spool having a transaxial bore with a diameter, said ratchet buckle integrally attached a length of wire rope, said wire rope having a free end and having a diameter smaller than the diameter of said bore, said ratchet buckle having a locking means disposed to receive a lock;
- wrapping said free end of said wire rope through a portion of said tree strand and around a portion of said tree;
- threading said wire rope through said bore, wherein said wire rope and said ratchet buckle encircle a portion of said tree and include a portion of said tree stand within said circle;
- pulling said wire rope to remove the slack in said wire rope;
- ratcheting said ratchet buckle to make said wire rope taut;
- closing said ratchet buckle;
- locking said ratchet buckle.

* * * * *